United States Patent [19]

DeVaul

[11] 3,858,216

[45] Dec. 31, 1974

[54] METHOD AND APPARATUS FOR LORAN RECEPTION

[76] Inventor: Wayne E. DeVaul, 2055 N.W. 25th St., Corvallis, Oreg. 97330

[22] Filed: Feb. 4, 1972

[21] Appl. No.: 223,652

[52] U.S. Cl.................................. 343/103, 343/105
[51] Int. Cl............................................. G01s 1/24
[58] Field of Search................. 343/103, 105, 114.5; 325/65, 473, 474, 476

[56] References Cited
UNITED STATES PATENTS
3,422,433   1/1969   DeVaul............................... 343/103
3,611,383  10/1971   Bar..................................... 343/103

*Primary Examiner*—T. H. Tubbesing
*Assistant Examiner*—T. M. Blum
*Attorney, Agent, or Firm*—Klarquist, Sparkman, Campbell, Leigh, Hall & Whinston

[57] ABSTRACT

A loran receiving system includes attenuator means connected in cascaded relation with a loran receiver input in response to determination of signal amplitude through detection of the slope of the first derivative of the signal envelope. Sky wave signals are selectively rejected by detection of the timing between portions of the received signal envelope.

24 Claims, 8 Drawing Figures

METHOD AND APPARATUS FOR LORAN RECEPTION

BACKGROUND OF THE INVENTION

As hereinafter indicated, automatic loran receiving equipment is available for "locking on" a pair of loran master and slave signals in response to frequency and channel selection. An output time or phase difference representative of a hyperbolic line of position is rapidly provided. However, automatic operation of this type is to a considerable extent dependent upon the loran receiver's producing a nondistorted waveform within predetermined amplitude limits. Unfortunately, loran signals which may be received from an antenna have a greater amplitude range than the practical dynamic range of a receiver and consequently the receiver must be adjusted in some way to provide variably adjustable gain or attenuation. If the receiver has fixed gain, high amplitude signals will be distorted on the one hand, and/or low amplitude signals will be ignored entirely. The situation may be corrected by operator observation of the loran signals on a cathode ray tube with manual adjustment of the selected signals so they fall within a predetermined standard range. This, of course, is inimical to automatic operation. Standard gain control circuits, on the other hand, have disadvantages because they are apt to limit the linearity desired in the loran receiver, wherein the proper timing of the loran signal bears a functional relationship to the wave shape of the received signal envelope. Moreover, automatic gain control circuitry of classic design is apt to be too slow for responding properly to loran signals because of receiver tuned circuit delay time and the like.

Another problem attendant to the automatic operation of loran receiver equipment is the ambiguity between ground wave and sky wave reception. A human operator can usually distinguish between the two signals but a strictly automatic system should be inherently responsive to the ground wave signal when desired.

SUMMARY OF THE INVENTION

In accordance with the method and apparatus of the present invention, a hyperbolic navigation system, e.g., a loran or similar navigation system, is provided with receiver means for detecting received signal envelopes and for determining the amplitude of an envelope from a parameter thereof, prior to reception of the peak of the envelope. Specifically, the slope of the first derivative of the input signal envelope is determined and selective amplitude determining or attenuating means is inserted in the receiver channel prior to reception of the envelope peak, the latter being representative of the envelope timing information. For each received envelope, the proper attenuation or amplitude determining means is inserted well ahead of the envelope peak. No operator intervention is required and the system is quite automatic.

According to an additional feature of the present invention, first and second points on the received signal envelope are ascertained for determining whether the signal is a ground wave or a sky wave signal. Specifically, first and second derivatives of the input signal envelope are developed, and if the timing of specified points on these derivative waveforms fall within a predetermined range, the signal is outputted for use by automatic line of position determining circuitry.

It is accordingly an object of the present invention to provide an improved method and apparatus for receiving hyperbolic navigation signals, facilitating the presentation of information relative to signal timing over a wide range of input signal strengths.

It is a further object of the present invention to provide an improved method and apparatus for hyperbolic navigation signal reception wherein the amplitude of a signal envelope is ascertained well before the peak value of the signal envelope, and proper attenuation means is inserted in cascaded relation with a receiver for each input signal envelope.

It is another object of the present invention to provide an improved method and apparatus for hyperbolic navigation signal reception for producing an output responsive to a wide range of input amplitude signal information without substantial distortion of the signal envelope.

It is another object of the present invention to provide an improved method and apparatus for hyperbolic navigation signal reception adapted to distinguish between sky wave and ground wave signals.

It is a further object of the present invention to provide an improved method and apparatus for hyperbolic navigation system reception adapted for rejecting distorted signal envelopes.

It is another object of the present invention to provide an improved method and apparatus for hyperbolic navigation signal reception wherein the derivative of a received signal envelope is produced and the timing of successive points on the derivative waveform is determined for directing proper receiver operation.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
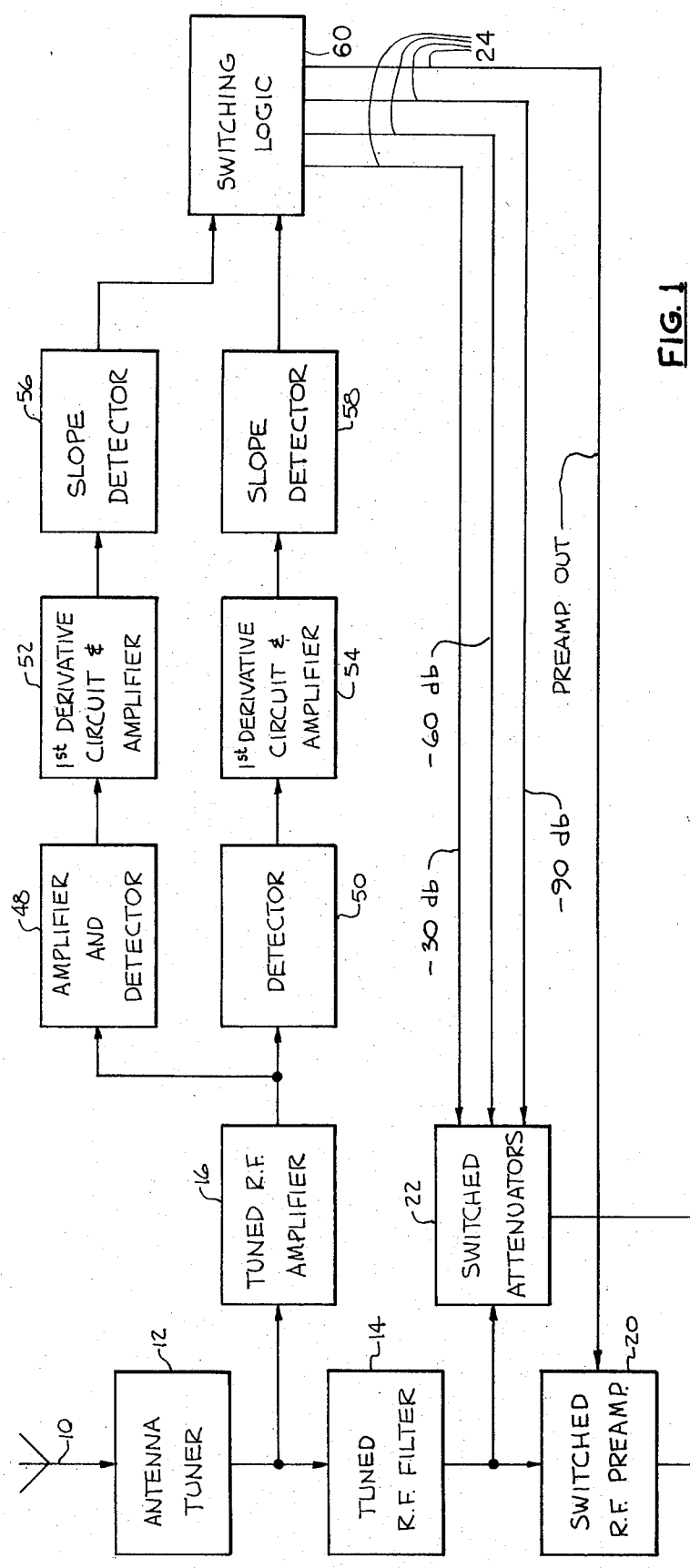
FIG. 1 is a block diagram of a hyperbolic navigation receiving system according to the present invention.
Figure 1:
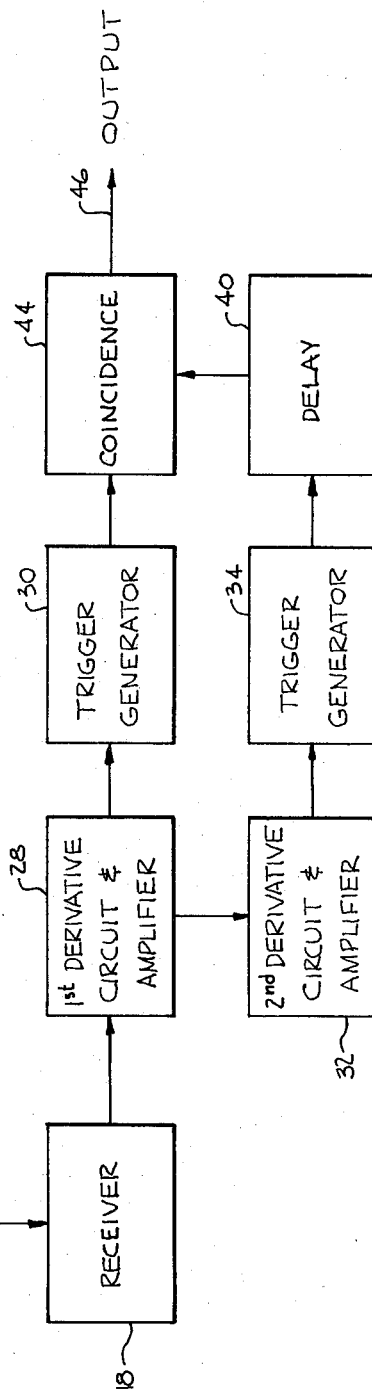

Referring to FIG. 1, a pulsed hyperbolic navigation receiver according to the present invention, specifically of the loran type, is illustrated in block diagram form. The input signal from antenna 10 is coupled via an antenna tuner 12 to a tuned RF filter 14 and a tuned RF amplifier 16. As hereinafter more fully described, the RF filter 14 and RF amplifier 16 as well as receiver circuit 18 are suitably tuned electronically to one of a number of loran frequencies, namely, 1,850 kilohertz, 1,900 kilohertz, or 1,950 kilohertz. The output of tuned RF filter 14 is supplied both to switched RF preamplifier 20 and to the switched attenuators indicated at 22, wherein a predetermined signal path is established either through the preamplifier 20 or one of the attenuators represented by block 22 in accordance with the control signals on leads 24.

The selected output of preamplifier 20 or the output of one of the attenuators indicated at 22 is supplied as an input to receiver circuit 18 which may be of a conventional loran type, i.e., a superheterodyne receiver for developing signal envelopes in response to the received input signals. The conventional envelope transmitted is of the form $(1 - \cos \theta)$ having a fundamental frequency of 12.5 kilohertz. Such an envelope is illustrated at A in FIG. 6 and has a duration of approximately 80 microseconds. As understood by those skilled in the art, the timing of the received envelope is taken as its maximum amplitude point, or the point in time at which the first derivative (waveform B in FIG. 6) of the received envelope crosses the zero axis in the negative going direction. The first derivative waveform is of the form $\sin \theta$ and crosses its zero axis at point 26 in FIG. 6.

Figure 6:
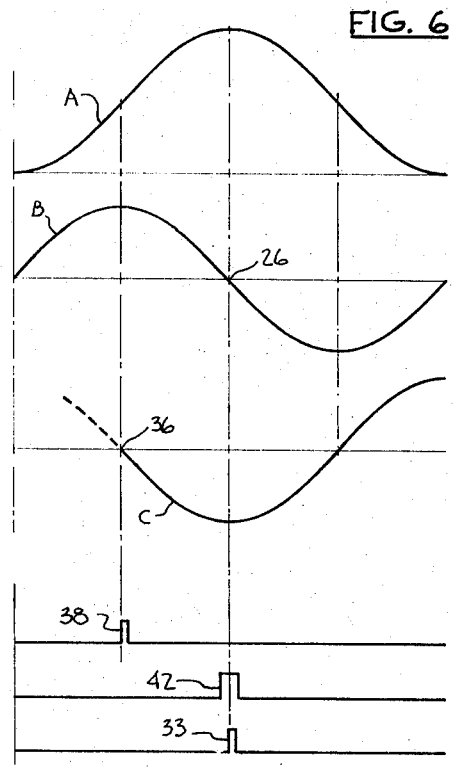
FIG. 6 is a waveform chart illustrating signal related waveforms, and timing pulse information derived therefrom for sky wave detection and rejection.

The first derivative of the signal envelope is derived by first derivative circuit and amplifier 28 in FIG. 1, the output of which is applied to trigger generator 30 employed for supplying a trigger output corresponding to crossing point 26, such output being further indicated at 33 in FIG. 6. The output of first derivative circuit and amplifier 28 is additionally supplied as an input to second derivative circuit and amplifier 32 in FIG. 1, driving a second trigger generator 34. The second derivative circuit and amplifier 32 supplies an output of the form $-\cos \theta$, indicated at C in FIG. 6, crossing its zero axis at point 36. Trigger generator 34 supplies an output trigger indicated at 38 in FIG. 6.

As will hereinafter be more fully explained, the output of trigger generator 34 is applied to a delay circuit 40 which generates a gating pulse 42 at a predetermined time after the occurrence of pulse 38, e.g., approximately 19 to 20 microseconds later. Gating pulse 42 is applied to coincidence circuit 44 and gates the aforementioned pulse 33 if it occurs within the time gating pulse 42 is present. An output is therefore supplied from the coincidence circuit for instance if the pulse 33 occurs at approximately 20 microseconds, plus or minus ½ microsecond, after the occurrence of the pulse 38, this timing indicating a nondistorted received signal envelope. If pulse 33 falls outside the gating pulse, no output will be produced. Generally speaking, the "sky wave" or signal received via an ionispheric reflection path will be distorted such that the 20 microsecond timing is not achieved. Consequently, the present circuit is principally responsive to ground wave reception, while rejecting the less reliable sky wave. As hereinafter more fully described, the gating circuit is alternatively disabled in case sky wave reception is to be utilized.

The output 46 is applicable to measurement logic and readout circuitry, e.g., of the type set forth in my U.S. Pat. No. 3,422,433 granted Jan. 14, 1969, wherein the timing between a master pulse and a slave pulse is ascertained for providing a "line of position" output.

The output of tuned RF amplifier 16 is supplied both to amplifier and detector 48, and detector 50, which respectively drive the first derivative circuit and amplifier 52, and first derivative circuit and amplifier 54. The outputs of the last mentioned detectors also comprise the aforementioned signal envelope of the form $(1 - \cos \theta)$. Consequently, the first derivative circuit receiving the detected output produces a signal of the form, $\sin \theta$. From FIG. 6 it will be noted the $\sin \theta$ wave shape, as indicated at B, is initially substantially linear, as further illustrated in FIG. 7, i.e., when the input or $(1 - \cos \theta)$ envelope is first received and detected. The slope of this waveform is employed as an indication of the eventual peak amplitude of the input signal envelope. The output of first derivative circuit and amplifier 52 is supplied to slope detector 56 while the output of first derivative circuit and amplifier 54 is applied to slope detector 58. These slope detectors indicate, in a manner hereinafter more fully described, the slopes of the first derivative waveforms within a few microseconds after the reception of the input signal, and provide outputs to switching logic circuitry 60, indicative of the amplitude of the input signal envelope.

As illustrated in FIG. 1, the switching logic circuitry 60 produces outputs via leads 24 coupled to switched RF preamplifier 20 and switches attenuators 22. In the absence of an input signal, RF preamplifier 20 is disposed in cascaded circuit relation between tuned RF filter 14 and receiver circuit 18. The same condition obtains if an input signal envelope is received, the first derivative of which has a relatively small slope, indicative of a small amplitude input signal. If the slope is somewhat greater, the switching logic circuitry 60 is actuated to provide an output on the lead marked −30 db, as well as an output on the lead marked preamp. out, for applying 30 db attenuation in the signal channel in place of preamplifier 20. If successively larger amplitude signals are received, 60 db or 90 db attenuation will be directed, still with the preamplifier withdrawn from the signal channel. The determination of the signal envelope amplitude and the application of the proper attenuation therefor occurs within approximately the first 7 to 10 microseconds of signal envelope detection, or well ahead of the maximum amplitude point of the signal envelope. Consequently, the receiver circuit can remain sensitive to weak signals up to the time of reception thereof, while not being overloaded or giving improper output timing information for strong signals.

Basically the receiver circuit 18 desirably operates at all times at full gain and bandwidth capabilities. The received signals are sampled to determine the amplitude thereof by measuring the slope of a suitable signal parameter, and the proper attenuation is applied so that the receiver circuit can operate at maximum gain and bandwidth capabilities without being overdriven. Therefore, the sinusoidal wave shape of the signal envelope can be preserved whereby the timing can be accurately determined, it being understood that if appreciable distortion were present in the receiver channel, the first derivative of the signal envelope would no longer accurately provide correct timing measurement of the peak of the input signal envelope. The determination of amplitude is made for each and every input signal, and the correct degree of amplification correction is applied in the signal channel prior to the time when the signal reaches its critical maximum value, with the maximum allowable decision time being less than 10 microseconds in a typical instance.

The receiver circuit, specifically indicated at 18 in FIG. 1, may be operated at full gain over the entire dynamic range of the receiver of typically 30 db, with minimum receiver produced distortion. The dynamic range of the receiver is the ratio, expressed in db, of the maximum RMS value of the signal as taken from the antenna output terminals, which signal can be amplified and detected and passed through signal conditioning circuits producing time related functions with no error resulting from amplifier induced distortion being detected, to the minimum RMS value of the signal as taken from the antenna output terminals, which signal can be amplified and detected and passed through the same signal conditioning circuit while producing the time related functions with no error resulting from noise induced distortion being detected. A distinct advantage of the present system is the increased speed of reaction thereof to very large signals.

The circuitry of the present invention is particularly applicable to automatic measurement logic and readout apparatus wherein individual loran signal pairs are selected automatically, and not manually after viewing the same on a CRT screen or the like. The circuit accommodates itself to very wide range of input signal levels, and rejects unwanted sky wave reflections as desired, so that automatic readout apparatus can be actuated with a minimum of selection time by the operator. Only the loran frequency need be selected, and the timing of the loran signal pairs, as discussed in the aforementioned patent, after which the complete system supplies the line of position information. However, of course, it will be realized the system herein disclosed for wide range amplitude accommodation as well as selective sky wave rejection, is advantageously employed with any other loran receiver system for thereby minimizing the operator error associated with the navigational determination.

Figure 2:
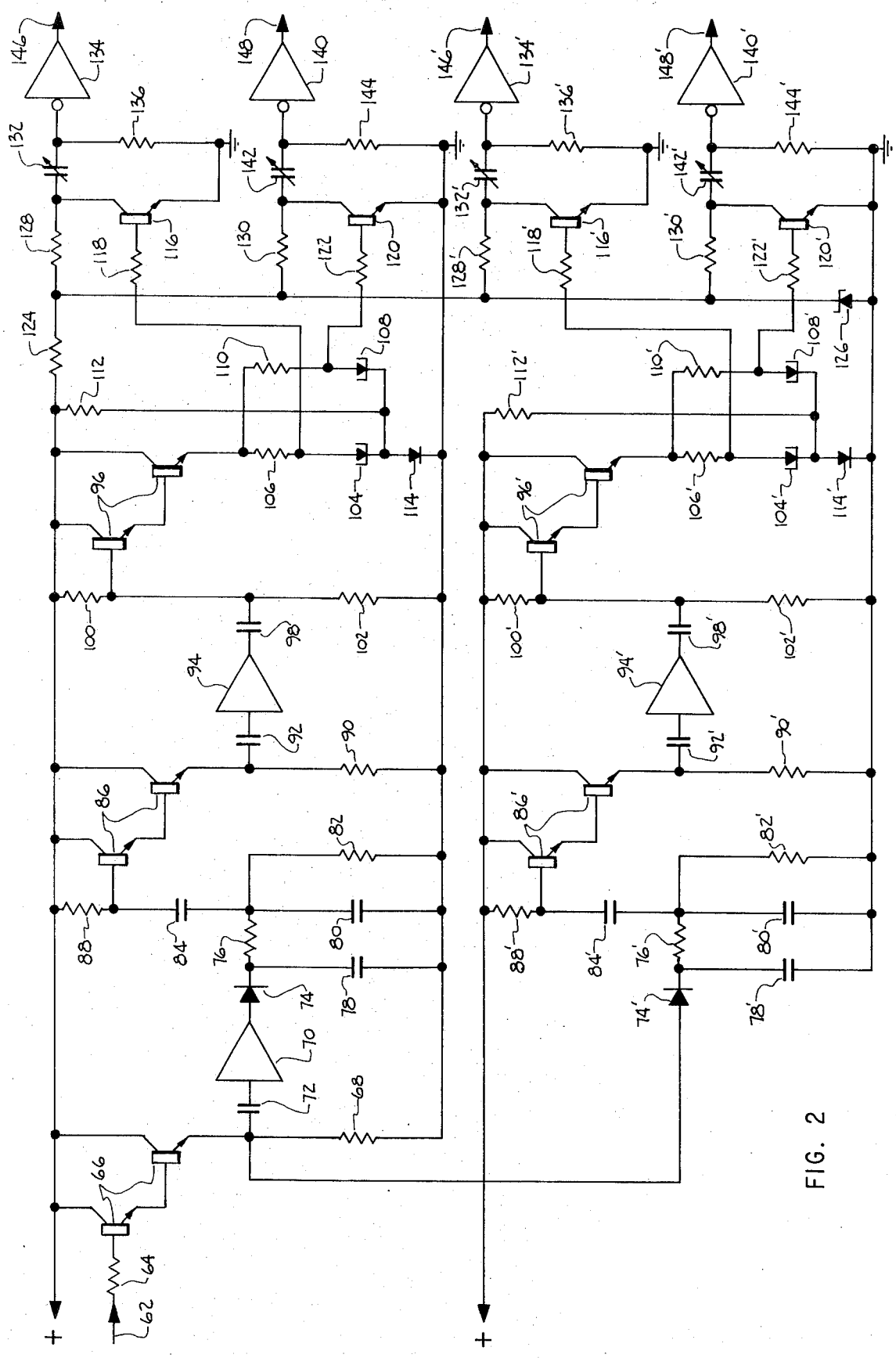
FIG. 2 is a schematic diagram of a first portion of the FIG. 1 circuit as concerned with determination of signal envelope amplitude.

Considering the circuitry according to the present invention in greater detail, FIG. 2 is a schematic diagram of the part of the FIG. 1 circuit represented by blocks 48, 50, 52, 54, 56 and 58. The input from tuned RF amplifier 16 is received at lead 62 and is coupled via resistor 64 to the base of the first of a pair of Darlington emitter-follower connected NPN transistors 66. The emitter of the second of transistors 66 is returned to ground through resistor 68, and is also coupled to the input of amplifier 70 by way of capacitor 72. The output of amplifier 70 is supplied to diode rectifier 74 at the anode thereof, while the rectifier's cathode is connected to the input of a filter circuit including series resistor 76 and a pair of capacitors 78 and 80 connected in shunt between either end of resistor 76 and ground. An output resistor 82 is disposed in parallel with capacitor 80, and a coupling capacitor 84 connects the ungrounded end of capacitor 80 to the base of the first of a pair of Darlington emitter-follower connected transistors 86. The base of the first of transistors 86 is coupled to a positive voltage via bias resistor 88, while the emitter of the second transistor is returned to ground through resistor 90. A coupling capacitor 92 is located between the emitter of the second of transistors 86 and the input to amplifier 94.

In turn, amplifier 94 drives the Darlington emitter-follower comprising silicon NPN transistors 96, the first of which has its base coupled to the output of amplifier 94 by capacitor 98, as well as to the midpoint of a biasing voltage divider comprising resistors 100 and 102. The emitter of the second of transistors 96 is coupled to the anode of first tunnel diode 104 via resistor 106, while being coupled to the anode of a second tunnel diode 108 with resistor 110. A resistor 112 is disposed between a positive voltage source and the cathodes of tunnel diodes 104 and 108, the last mentioned connection also being returned to ground through diode 114. In a specific embodiment, resistors 106 and 110 were 1,000-ohm potentiometers set to values of approximately 330 ohms and 500 ohms, respectively, while elements 104 and 108 were one mil germanium tunnel diodes.

The anode of tunnel diode 104 is coupled to the base of transistor 116 with coupling resistor 118, while the anode of tunnel diode 108 is similarly coupled to the base of transistor 120 via coupling resistor 122. A power supply for transistors 116 and 120 comprises a resistor 124 and zener diode 126 disposed in series between a positive voltage and ground, wherein collector resistor 128 is connected to the junction between resistor 124 and zener diode 126, while collector resistor 130 for transistor 120 is connected to the same point. Coupling capacitor 132 is interposed between the collector of transistor 116 and the inverting input of an amplifier 134 provided with an input resistor 136 returned to ground. Similarly, the collector of transistor 120 is coupled to the inverting input of an amplifier 140 via capacitor 142. A resistor 144 is located between the input of amplifier 140 and ground.

The bottom channel in FIG. 2 includes a diode 74' coupled to the emitter of the second of transistors 66. The remainder of the circuit substantially duplicates the already described portion of the circuit configuration, except for the lack of an amplifier corresponding to amplifier 70. The lower portion of the circuit, which is referred to employing primed reference numerals, thus achieves a lower degree of amplification, specifically about 30 db less. The lower portion of the circuit otherwise functions in a substantially similar manner with correspondingly numbered elements performing the same individual functions.

Diodes 74 and 74' perform detecting functions whereby an input received at terminal 62 is detected and a loran waveform envelope $(1 - \cos \theta)$ is established across resistors 82 and 82', the envelope provided across resistor 82 being of greater amplitude. The detected outputs are applied to the respective amplifiers 94 and 94' via the Darlington emitter-followers 86 and 86'. The values of coupling capacitors 92 and 92' are chosen such that differentiation providing a substantial 90° phase shift is accomplished in combination with the input resistance of amplifiers 94 and 94', such input resistance being approximately 100 ohms in the case of a particular embodiment, and capacitors 92 and 92' each having a value of approximately 2,000 picofarads. The nearly 90° phase shift provides the first derivative or sine function illustrated at B in FIG. 6 in response to the detected input waveform envelope A. While appreciable attenuation takes place in the 90° phase shifting circuit, the further amplification provided by amplifiers 94 and 94' supplies the proper amplitude signal for operating the remainder of the circuit.

Amplifiers 94 and 94' drive tunnel diodes 104 and 108 via Darlington emitter-follower 96, and tunnel diodes 104', 108' through Darlington emitter-follower 96'. The circuit including resistors 112 and diode 114, and the corresponding primed elements, supplies the proper bias level at the cathodes of tunnel diodes 104 and 108 substantially corresponding to the base-emitter drop of transistors 116 and 120. For very small signals, both tunnel diodes 104 and 108 remain in their low voltage state. However, as the input signal amplitude increases, and the first derivative B increases, sufficient current will be applied to tunnel diode 104 for changing its condition from the low voltage state to the high voltage state. Correspondingly, transistor 116 will have its base driven positively, causing a negative-going step function at the collector thereof. This function is differentiated by the combination of capacitor 132 and resistor 136, while amplifier 134 inverts the same for providing a positive-going impulse at output lead 146. As the input increases further in amplitude, the point will be reached at which sufficient current is provided to tunnel diode 108 for switching the latter from its low voltage state to its high voltage state. As a consequence, transistor 120 is driven and a positive output spike is provided on amplifier 140's output lead 148. The values of resistors 106 and 110 are chosen such that greater current is permitted in tunnel diode 104. Since the lower channel provides a lesser degree of amplification, it will be seen that an even greater input amplitude will be required for switching tunnel diodes 104' and 108' in that order. Assuming the signal amplitude is of sufficient value, tunnel diode 104' will first be operated, causing an output spike at output lead 146' of amplifier 134'. Then an output will be produced on output lead 148' of amplifier 140'. The timing of the currents of output spikes on leads 146, 148, 146' and 148' will provide an indication of the slope of the first derivative of the input signal.

Capacitors 132, 132', 142 and 142' are variable and are adjusted so that the pulse outputs at 148, 148' are about 1.5 times as wide as the pulse outputs at 146, 146'. The terminal or negative-going portions of these pulses are effective for triggering one-short multivibrators OS2, OS4 and OS6 later than one-shot multivibrators OS1, OS3 and OS5 in FIG. 3.

Considering the values at which the respective tunnel diodes are operative, tunnel diodes 104 and 104' will switch from their low voltage state to their high voltage state when the first derivative waveform B as in FIG. 6 reaches approximately the 400 millivolt level. Consider a given example of a 350 microvolt RMS input signal at the antenna, for which a portion of waveform B, comprising the first few microseconds, is illustrated in magnified fashion in FIG. 7. A second tunnel diode, 108, will switch from its low voltage state to its high voltage state when the first derivative waveform reaches approximately the 700 millivolt level. In the case illustrated by FIG. 7, the rate of rise of the first derivative waveform is approximately 156 millivolts per microsecond. As hereinafter more fully described, a signal of these characteristics will operate the switching logic for providing a first degree of attenuation in the circuit. It will be realized, of course, that since a greater degree of amplification is provided in the upper channel in the FIG. 2 schematic diagram than in the lower channel, tunnel diodes 104' and 108' are actually actuated for higher amplitude input signals than is the case for tunnel diodes 104 and 108.

Figure 3:
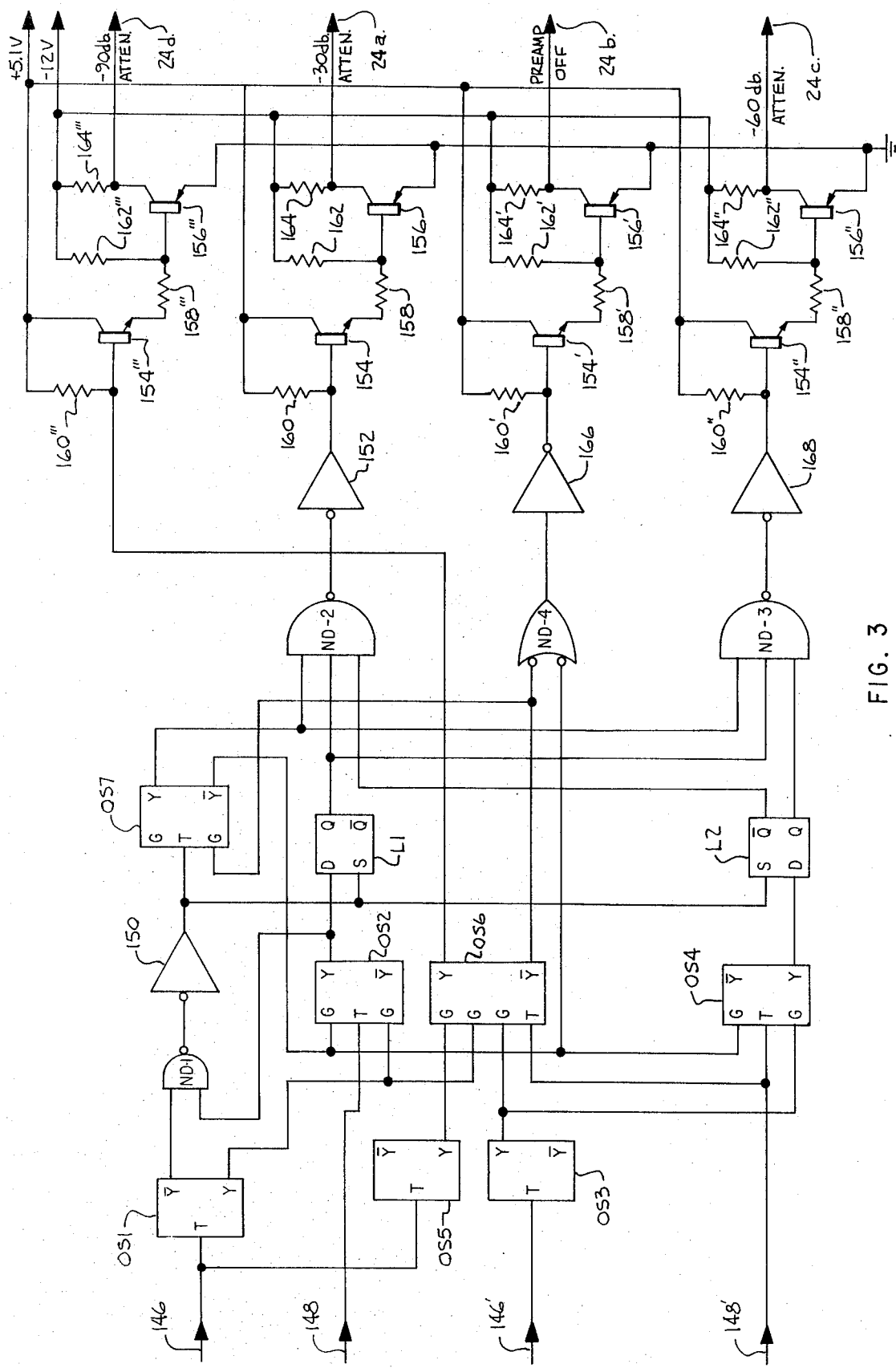
FIG. 3 is a diagram, partially schematic and partially block diagram in form, illustrating logic circuitry used in conjunction with FIG. 2 circuit for ascertaining the amplitude of an input signal envelope.

Considering FIG. 3, switching logic is illustrated for receiving the outputs of amplifiers 134, 140, 134' and 140' in FIG. 2 on leads 146, 148, 146' and 148'. The circuit of FIG. 3 operates to bring about the attenuating of signals or the pre-amplifying of signals as follows: If the output from the antenna is below 350 microvolts, preamplifier 20 remains in the circuit. If the input signal is within the following ranges, RMS, the following attenuation is supplied:

| | |
|---|---|
| 350 microvolts to 11.1 millivolts | −30 db attenuation |
| 11.1 millivolts to 350 millivolts | −60 db attenuation |
| 350 millivolts to 5 volts | −90 db attenuation |

The amplification or attenuation is applied such that the input actually supplied to receiver 18 will be within a standard range of approximately 11.1 microvolts to 350 microvolts, although the actual input may vary from almost 0 to 5 volts.

Further considering the operation of the FIG. 3 circuit, the input spike on lead 146 is supplied to one-shot multivibrator OS1 and to one-shot multivibrator OS5, wherein the output of OS1 has a duration of approximately 2 microseconds. The output waveform of one-shot multivibrator OS1 is illustrated at A in FIG. 8, starting at a time approximately 2.6 microseconds from the beginning of the first derivative waveform for a 350 microvolt signal and corresponding to the 400 millivolt waveform actuation of tunnel diode 104 (See FIG. 7). The Y positive-going output of OS1 is applied as a gating input to one-shot multivibrator OS2, the said multivibrator OS2 also receiving a $\overline{Y}$ gating input from the output of one-shot multivibrator OS7, as well as a triggering input on lead 148. The Y output of multivibrator OS2 is applied as an input to nand-gate ND-1 together with the $\overline{Y}$ output of multivibrator of OS1, nand-gate ND-1 driving inverting amplifier 150 for supplying a triggering input to one-shot multivibrator OS7.

The Y output of OS1 is thus supplied as an enabling input to OS2, and if the first derivative signal slope is at least 156 millivolts per microsecond, multivibrator OS2 will be triggered from lead 148. Thus, referring again to FIG. 7, when the requisite slope exists, the 700 millivolt level on the first derivative waveform will be reached within 2 microseconds after the 400 millivolt level was reached, and tunnel diode 108 will be actuated providing the input on lead 148 in FIG. 3 for operating one-shot multivibrator OS2 while the Y output of OS1 is still up. If the slope of the FIG. 7 waveform were somewhat less, one-shot multivibrator OS2 would not be triggered within its enabled period of 2 microseconds. Assuming one-shot multivibrator OS2 is triggered, this multivibrator will produce an output which is from 2 to 5 microseconds in duration as illustrated at B in FIG. 8. For instance, such output may be 2.5 microseconds in duration.

The Y output of multivibrator OS2 is further applied to latch circuit L1 which operates to transfer its D input to its Q output when input S is energized. It will be seen that the S input is provided from inverting amplifier 150 so latch L1 will produce a Q output (C in FIG. 8) applicable to nand-gate ND-2 when multivibrator OS1 turns off and multivibrator OS2 is still on. Furthermore, one-shot multivibrator OS7 is energized to provide an approximately 100 microsecond control signal as an input to nand-gate ND-2, and output $\bar{Q}$ of latching circuit L2 is also up at this time, whereby all three inputs of nand-gate ND-2 are energized for supplying, via inverting amplifier 152, a positive-going pulse for application to the base of transistor 154. Transistor 154 is coupled in emitter-follower fashion to drive transistor 156 via coupling resistor 158, the base of transistor 154 being returned to +5.1 volts through bias resistor 160, and the base of transistor 156 being connected to a −12 volts by way of bias resistor 162. The positive-going input at the base of transistor 154 produces a positive-going signal at the base of transistor 156 and a negative-going step at the −30 db attenuation command output lead 24a coupled to the junction between the collector of transistor 156 and collector-resistor 164, the opposite terminal of which is returned to −12 volts. The negative-going step at lead 24a is supplied to provide substantially immediate 30 db attenuation in the signal channel in a manner hereinafter more fully described within switched attenuators 22 in FIG. 1.

It will be noted that when one-shot multivibrator OS7 is actuated, the $\bar{Y}$ output terminates for approximately 100 microseconds and consequently an input for nor-gate ND-4 is provided for causing a negative-going output from inverter 166. Gate ND-4 provides an output when either input thereof goes low. The negative-going output from inverter 166 is transferred from the base of transistor 154' to the base of transistor 156', producing a positive-going output at preamp-off command lead 24b. Thus, the preamplifier 20 in FIG. 1 is disabled, when a 30 db attenuation command is supplied for operating switches attenuators 22.

The remainder of the components associated with transistors 154' and 156' are designated by reference numerals similar to elements hereinbefore described and have substantially similar functions. Components associated with transistors 154'', 156'', 154''' and 156''' are likewise similarly indicated.

Figure 7:
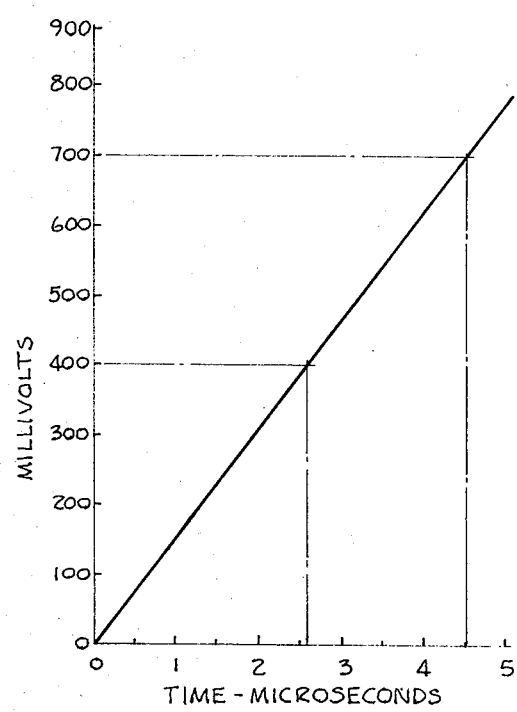
FIG. 7 is an enlarged view of the initial portion of waveform B in FIG. 6.

When the input signal reaches an RMS value of 11.1 millivolts, the circuit constants are arranged in the lower part of the FIG. 2 circuit such that leads 146' and 148' will be successively actuated in response to tunnel diodes 104' and 108' successively transferring to their high voltage states. This succession of operations is employed, when the proper time relationship occurs, for energizing the −60 db attenuation command on lead 24c. When the trigger on lead 146' is received, the one-shot multivibrator OS3 supplies an output of approximately 2 microseconds, as can be seen for the 11.1 millivolt case at D in FIG. 8. One-shot multivibrator OS4 is enabled by the Y output of OS3, and the Y output of OS4 (E in FIG. 8) produces a Q output from latch L2, the latter also receiving an S input from inverting amplifier 150. The Q output from latch L2 (similar to waveform C in FIG. 8) provides an input to nand-gate ND-3, while the $\bar{Q}$ output of latch L2 lowers for de-energizing nand-gate ND-2. One-shot multivibrator OS7 is triggered by inverting amplifier 150 for supplying an additional input to nand-gate ND-3, while the third input for gate ND-3 is provided from the Q output of latch L1. It will thus be seen that the operation of one-shot multivibrators OS3 and OS4 together with latch L2 functions in a manner similar to that described for components OS1, OS2 and L1, above, whereby a positive-going output is supplied from inverting amplifier 168 when the input signal exceeds 11.1 millivolts RMS. Consequently, a −60 db attenuation command is provided on lead 24c instead of on lead 24a. However, the preamp-off command will still be present on lead 24b. As appears, FIG. 7 is descriptive of the operation of the switching circuitry for the 11.1 millivolt case in the same manner as it was descriptive of switching circuit operation for the 350 microvolt case, but the input signal amplitude in the latter instance actually has the greater value since the lower channel in FIG. 2 provides the lower amplification.

Figure 8:
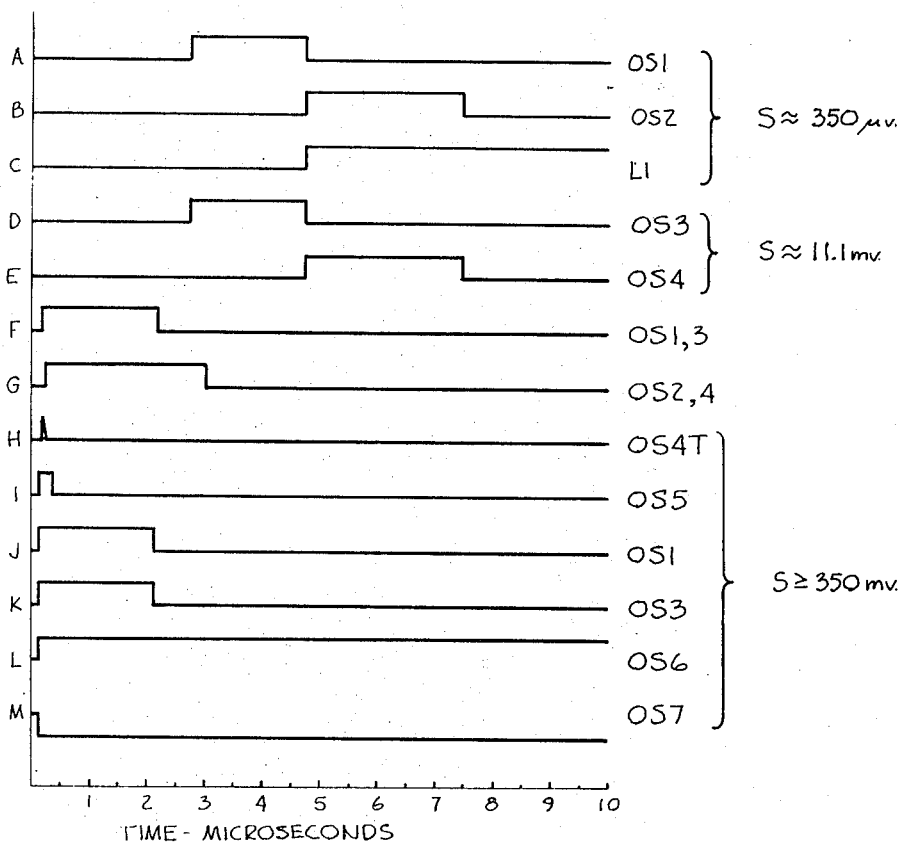
FIG. 8 is a waveform chart illustrating operation of the logic circuitry of FIG. 3.

The waveforms marked F and G in FIG. 8, represent either OS1 and OS2 outputs respectively in the case where the RMS input exceeds 11.1 millivolts, or alternatively the OS3 and OS4 outputs when the RMS input exceeds 350 millivolts. It will be seen that for the 11.1 millivolt case, for instance, one-shot multivibrators OS1 and OS2 still function for operating nand-Gate ND-1 and one-shot multivibrator OS7, while providing the S inputs for latches L1 and L2.

When the RMS input exceeds 350 millivolts, the four tunnel diodes are actuated at nearly the same time and waveforms F and G in FIG. 8 are representative of the outputs of the four one-shot multivibrators. When all four tunnel diodes and one-shots operate, the maximum degree of attenuation is provided in a rapid manner as hereinafter described. One-shot multivibrator OS6 is supplied gating inputs from one-shot multivibrators OS1, OS5 and OS3. One-shot multivibrator OS6 is also triggered from the same input, on lead 148', as employed to trigger one-shot multivibrator OS4, this triggering signal being illustrated at H in FIG. 8. Waveform I illustrates the approximately 400 nanosecond output of one-shot multivibrator OS5 triggered at the same time as OS1. If a triggering signal is provided on lead 148' while OS5 is still on, then one-shot multivibrator OS6 provides a Y output applied to transistor 154'''. Transistor 154''' drives transistor 156''', causing a −90 db attenuation command to be supplied on lead 24d. Gate ND-4 will be energized from the $\bar{Y}$ output of OS6 whereby the preamp-off command is still supplied on lead 24b. Since the $\bar{Y}$ output of one-shot multivibrator OS6 drops, one-shot multivibrator OS7 is no longer energized, and consequently neither gate ND-2 or ND-3 will be energized. One-shot multivibrator OS6 supplies an output for approximately 100 microseconds to the base of transistor 154'''. The switching time for the production of the output on lead 24d is less than for the recognition of the other signal amplitudes, which is clearly advantageous in the case of attenuating the larger amplitude signal.

Figure 4:
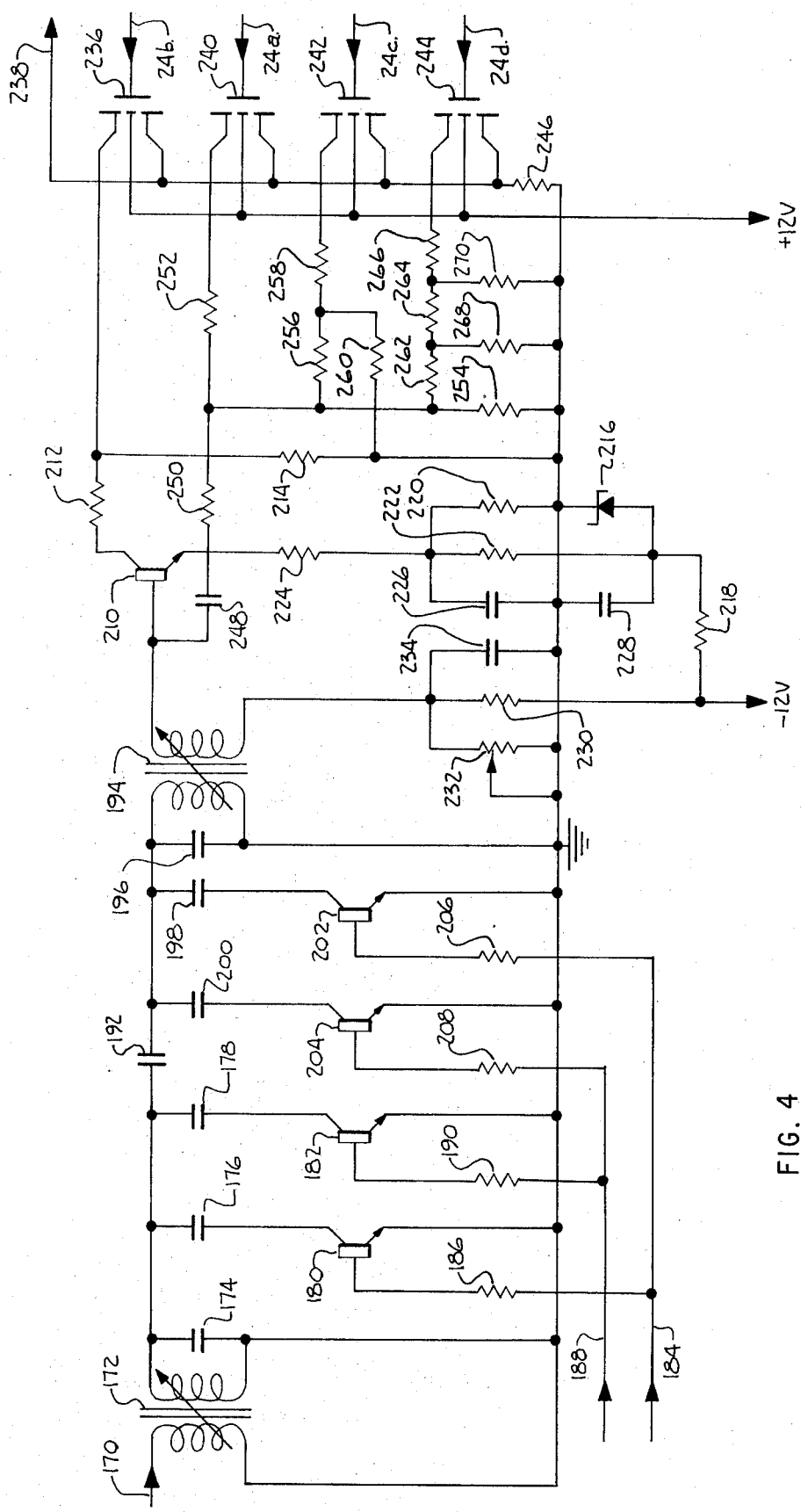
FIG. 4 is a schematic diagram of another circuit portion of the present invention adapted for insertion of selected amplification or attenuation means is cascaded relation with the receiver.

Referring now to FIG. 4, circuitry is illustrated corresponding to blocks 14, 20 and 22 in FIG. 1, i.e., the tuned RF filter, the switched RF preamplifier, and the switched attenuators. The input signal is received from the antenna tuner on lead 170 and applied to the primary of tuned RF transformer 172, having a capacitor 174 shunted across the secondary winding thereof. In addition, further capacitors 176 and 178 are selectively disposed in parallel with capacitor 174 by means of switching transistors 180 and 182, respectively. The base of transistor 180 is coupled to a control lead 184 by way of coupling resistor 186, while the base of transistor 182 is connected to control lead 188 by means of coupling resistor 190. With both leads 184 and 188 coupled to a relatively negative value, the input tuned circuit is tuned to the higher loran frequency, i.e., 1,950 kilohertz. As leads 184 and 188 are energized, the tuned circuit may be tuned to one of the lower loran frequencies. The tuned circuits in the remainder of the system may be similarly controlled.

A coupling capacitor 192 couples the input portion of the tuned RF filter to the output portion comprising a second tuned transformer 194 having a capacitor 196 shunted across the primary thereof. Further tuning capacitors 198 and 200 may be placed in shunt with the capacitor 196 by operation of transistors 202 and 204 having their bases coupled to control leads 184 and 186 by means of coupling resistors 206 and 208. The second half of the tuned RF filter operates in a manner similar to first described portion, and the secondary output of transformer is selective to the desired frequency.

The principal element of the switched RF preamplifier comprises a transistor 210 having its base connected to the secondary of transformer 194 and its collector coupled via a voltage divider comprising resistors 212 and 214 to ground. The emitter of transistor 210 is returned to a negative voltage supplied from zener diode 216 connected to a −12 volts through resistor 218. A voltage divider comprising resistors 220 and 222 is connected across zener diode 216, with the emitter of transistor 210 being connected to the midpoint thereof by resistor 224. Such midpoint, as well as the remote end of the zener diode, are bypassed to ground with capacitors 226 and 228. Also, the remaining terminal of the secondary of transformer 194 is returned to the midpoint of a voltage divider comprising resistor 230 and potentiometer 232 connected between a −12 volts and ground, whereby the voltage level of such secondary winding is adjustable with such potentiometer. The last mentioned transformer terminal is bypassed to ground for RF currents by means of capacitor 234.

The preamplifier comprising transistor 210 is coupled in the circuit via resistor 212 and MOS field effect transistor 236 which normally has a relatively negative voltage applied to the gate thereof via lead 24b from FIG. 3. Therefore, the field effect transistor is normally conductive for supplying an output on lead 238 for application to the receiver. Thus, the receiver is normally in a condition to detect the weakest signals, although the preamplifier is designed primarily to make up for losses in the attenuation network also provided. When one of the hereinbefore mentioned attenuations is commanded, a relatively positivegoing voltage step is applied to the gate of the field effect transistor 236 for disabling the same. The switched attenuators employ MOS field effect transistors 240, 242 and 244 respectively enabled by leads 24a, 24c and 24d. Each of the transistors 236, 240, 242 and 244 is suitably a P channel enhancement type MOS field effect transistor. The drain terminals are coupled to the junction between the secondary of transformer 194 and the base of transistor 210, via capacitor 248 and the various attenuator means designed to provide the hereinbefore designated attenuation values. A first network comprises series resistors 250 and 252 disposed between capacitor 248 and transistor 240, with a resistor 254 returning the midpoint of the last mentioned resistors to ground forming a T-pad arrangement having values chosen for supplying −30 db attenuation between transformer 194 and output lead 238. Second attenuator means is coupled to the midpoint between resistors 250 and 252 and further includes series resistors 256 and 258 disposed between such junction and transistor 242, as well as a resistor 260 disposed between the center tap of the last two mentioned resistors and ground. This network, in conjunction with resistors 250, is designed to provide −60 db attenuation. Further −90 db attenuator means comprises series connected resistors 262, 264 and 266 disposed between midpoint of resistors 250, 252 and transistor 244. Additional resistors 268 and 270 shunt the interconnections between resistors 262, 264, 266 to ground. The total network is designed to provide appropriate impedance matching during the circuit operation, considering the impedance of the field effect transistors in the case when the circuitry is arrranged to couple at a relatively low characteristic impedance value. It will be observed that further attenuating sections are included in the successive attenuators for supplying successively greater degrees of attenuation, with the selection of the specific resistance values following well-known electrical engineering practices.

It will thus be seen that only the attenuator network associated with particular desired attenuation value will be the circuit at any one time between the base of transistor 210 and output lead 238. In the absence of an attenuation command on one of the leads 24a, 24c or 24d, preamplifier transistor 210 will be coupled to output lead 238 by way of transistor 236 energized on lead 24b. So far as the input from transformer 194 is concerned, the various attenuator sections are substantially continuously energized, with the input impedance of such attenuator sections being appropriately chosen to provide overall impedance matching. As hereinbefore mentioned, the purpose of preamplifier transistor 210 is mainly to make up for the loss occasioned by the continued connection of the attenuation networks, even when none of the outputs thereof are selected.

As will be appreciated by those skilled in the art, more tuned circuit sections are suitably included in tuned RF filter 14 than in tuned RF amplifier 16 in order to produce a few more microseconds delay. This aids slightly in the early application of attenuation to the signal envelope so far as the receiver channel is concerned. However, the principal gain in time is produced by slope determination of the first derivative early in the reception period.

As can be seen from the waveform charts of FIG. 6, in conjunction with the waveform chart of FIG. 7 and the previous discussion, the determination of the input amplitude is made from the slope of the first derivative, and the appropriate attenuation is applied for the range within which the input signal amplitude falls. This attenuation is applied for each input signal envelope, A in FIG. 6, well before the peak value thereof indicative of the timing information further indicated at crossover point 26 of waveform B, and by resultant pulse 33. Therefore, each of the loran signal envelopes is presented to the receiver in such a way that all envelopes fall within the practical operating range of the receiver. Therefore, high amplitude input signals do not cause receiver distortion which would interfere with the proper ascertaining of the peak of waveform A, and low amplitude signals may still be detected and utilized.

Figure 5:
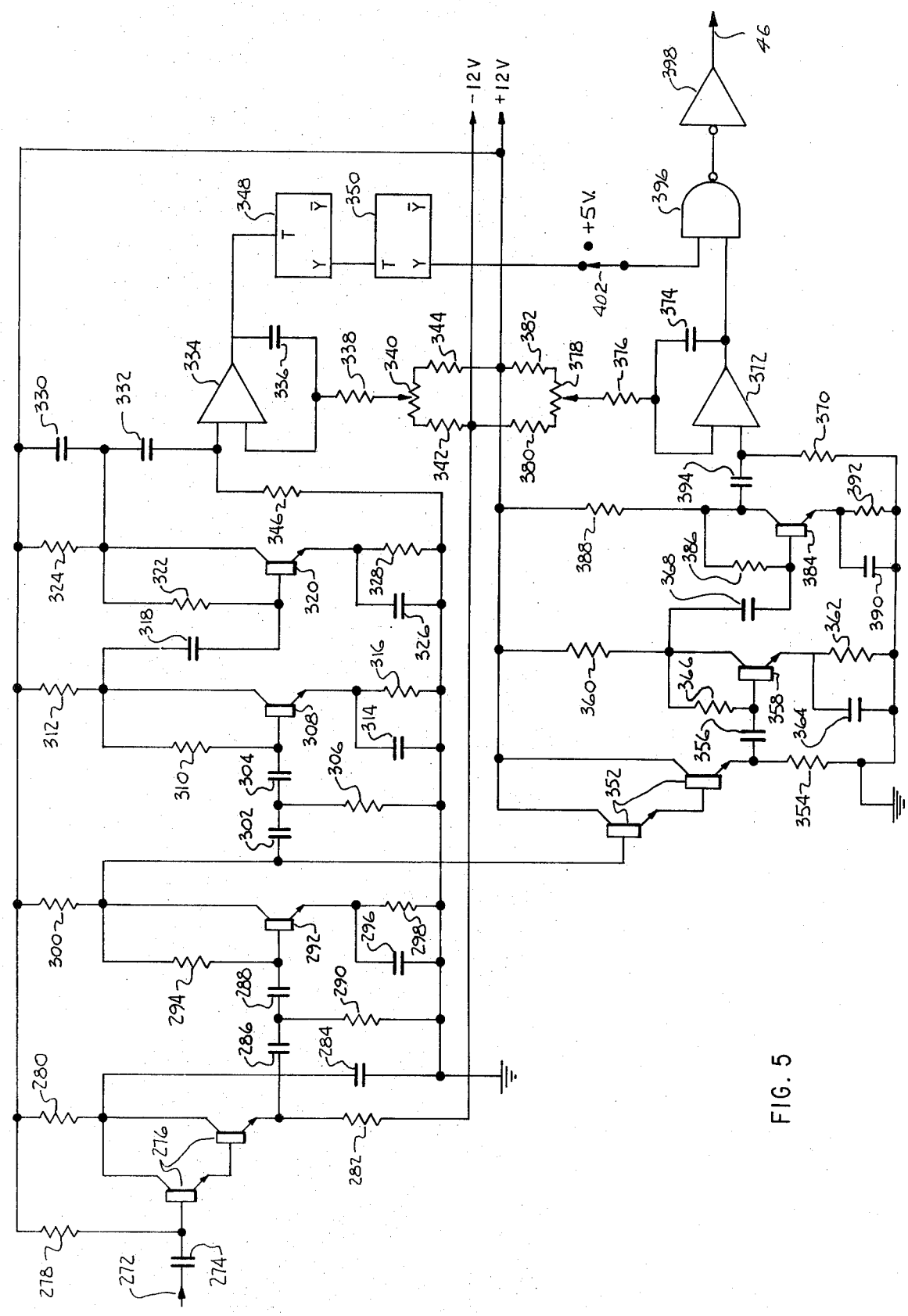
FIG. 5 is a schematic diagram of another circuit portion of the present invention related to ascertaining and rejecting sky wave signals, and for producing an output.

Returning to FIG. 1, the receiver 18 receives the proper attenuated signal as just described and functions to provide a detected and amplified envelope A as illustrated in FIG. 6. Since the receiver input amplitude is in a proper range as just discussed, the receiver will not distort the waveform and consequently the proper timing information may be derived therefrom. Referring to FIG. 5, circuitry is illustrated for receiving the output of the receiver, such output comprising an envelope as illustrated at A in FIG. 6, and for deriving timing information therefrom. In accordance with a feature of the present invention, the FIG. 5 circuitry selectively discriminates against sky wave reception. The FIG. 5 circuit corresponds to blocks 28, 30, 32, 34, 40 and 44 in FIG. 1.

Referring to FIG. 5, the output of the receiver is provided on lead 272 and is coupled via capacitor 274 to a Darlington emitter-follower 276 having a collector resistor 280 connected to a +12 volts, a base bias resistor 278, and an emitter output resistor 282 returned to a −12 volts. A capacitor 284 shunts the collector terminal to ground.

The input provided on lead 272 and supplied at the last emitter of Darlington emitter-follower 276 comprises the detected and amplified envelope from the receiver, A in FIG. 6, but inverted in the particular instance of the circuit described. Thus, the envelope at the last emitter of transistors 276 is of the form −(1 - cos $\theta$). This waveform is applied to a substantially 90° phase shifting circuit, comprising capacitors 286 and 288 in series and resistor 290 shunted from their midpoint to ground, to the base of transistor 292. The circuit comprising elements 286, 288 and 290 differentiates or provides the first derivative of the waveform applied, and thus the input at the base of transistor 292 is of the form −sin $\theta$ corresponding to waveform B in FIG. 6, but inverted. The transistor stage 292 is provided with a collector resistor 300, a base bias resistor 294 and an emitter resistor 298 returned to ground and shunted by capacitor 296. Transistor 292 inverts and amplifies the signal whereby the collector output thereof is of the form sin $\theta$, equivalent to waveform B of FIG. 6. It will be noted this first derivative signal is applied to a Darlington emitter-follower 352, the second emitter of which is returned to ground through resistor 354.

The first derivative signal is also applied through a phase shifting circuit including capacitors 302 and 304, in series, to the base of transistor 308. The junction between capacitors 302 and 304 is returned to ground employing resistor 306. This phase shifting circuit produces another substantially 90° phase shift in the signal and thus supplies a waveform at the base of transistor 308 of the form cos $\theta$ corresponding to waveform C in FIG. 6.

Transistor 308 is similarly provided with a collector resistor 312, a base bias resistor 310, and an emitter resistor 316 shunted by bypass capacitor 314. Transistor 308 inverts and amplifies the waveform providing an output at its collector of the form - cos $\theta$. This output is coupled to the base of transistor 320 by way of capacitor 318, transistor 320 having a collector resistor 324 coupling the collector to +12 volts, a base bias resistor 322, and an emitter resistor 328 shunted with capacitor 326. The transistor 320 amplifies the signal and inverts the same once more, supplying an output of the form cos $\theta$ at its collector. This output is coupled to one input of differential amplifier 334 through capacitor 332, with capacitor 330 connected to +12 volts functioning as a noise filter. The same input of amplifier 334 is returned to ground via resistor 346.

The remaining input of differential amplifier 334 is coupled to the movable tap of a potentiometer 340 through coupling resistor 338, and the outside terminals of potentiometer 340 are connected to a +12 volts and a −12 volts respectively by means of resistors 344 and 342. Adjustment of potentiometer 340 varies the threshold point at which amplifier 334 supplies an output signal. It is desired that an output signal be provided substantially precisely when the waveform coupled from the collector of transistor 320 crosses the zero axis of ground level in a negative-going direction. The waveform at the collector of transistor 320 corresponds to waveform C in FIG. 6, and the output of amplifier 334 comprises a pulse 38 in FIG. 6 occurring at the time of crossing point 36 (where waveform C crosses the axis). Potentiometer 340 is adjusted such that the output is thus provided at the zero axis crossing time. Amplifier 334 is connected as a one-shot multivibrator employing a feedback capacitor 336 coupled between the output and the input of amplifier 334 connected to resistor 338 wherein the circuit supplies an output pulse of relatively short duration. This output is applied as a triggering signal to one-shot multivibrator 348 which in turn triggers one-shot multivibrator 350. Multivibrator 348 produces an output pulse approximately 19.5 microseconds in duration and multivibrator 350 is triggered at the end of this period for supplying an output gate of approximately 1 microsecond duration, as illustrated at 42 in FIG. 6. Waveform 42 is supplied as an enabling, gating input to nand-gate 396, assuming switch 402 is thrown to the left-hand position. If switch 402 is in the right-hand position, i.e., connected to a +5 volts, nand-gate 396 is continuously enabled. As thus appears, output pulse 38 from amplifier 334 is effective to provide the gating pulse 42, starting 19.5 microseconds later, whereby the maximum point of input signal envelope A, or the crossover point 26 of first derivative waveform B, would substantially bisect gate pulse 42, assuming 12.5 kilohertz undistorted input envelope A.

As hereinbefore mentioned, the first derivative or sin $\theta$ output of transistor 292 is supplied to Darlington emitter-follower 352. The output of the last mentioned emitter-follower is coupled to the base of transistor 358 through capacitor 356, transistor 358 being provided with a collector resistor 360, base bias resistor 366, an emitter resistor 362, and an emitter resistor shunting capacitor 364. The transistor 358 inverts the input signal applied thereto, and amplifies the same, producing an output of the form - sin $\theta$. This waveform is coupled through capacitor 368 to the base of transistor 384, the last mentioned transistor having its collector connected to +12 volts via resistor 388, and further being provided with a base bias resistor 386, an emitter resistor 392, and a capacitor 390 shunting the emitter resistor. Transistor 384 re-inverts the - sin $\theta$ waveform, providing a sin $\theta$ input for differential amplifier 372 via coupling resistor 394. This input to amplifier 372 is returned to ground by means of resistor 370.

A second input of differential amplifier 372 is supplied from the movable tap of potentiometer 378 through resistor 376, the end terminals of potentiometer 378 being connected to a +12 volts and a −12 volts respectively by resistors 382 and 380. A feedback capacitor 374 is also interposed between the output of amplifier 372 and the last mentioned input thereof. Amplifier 372 operates in a similar manner to the operation described above for amplifier 334 for supplying an output pulse of short duration when the input from capacitor 394 crosses the zero axis in a negative-going direction. For example, the output of amplifier 372 is illustrated at 33 in FIG. 6. This output is applied as a second input to nand-gate 396, and the output of nand-gate 396 is in turn coupled via inverter 398 to output lead 46. An output will be supplied on lead 46 if the first derivative waveform B in FIG. 6 crosses the axis at point 26 substantially 20 microseconds after the second derivative waveform (illustrated at C in FIG. 6) crosses the axis at 36. If distortion due to ionispheric reflection or the like is sufficient to cause a shift of plus or minus 500 nanoseconds in the normal 20 microsecond period between the first derivative zero crossing and the earliest second derivative zero crossing, no output will be enabled from gate 396. As can be seen from FIG. 6, these crossings represent successive detected points on the original input waveform envelope at A. Sky waves are ordinarily reflected from layers of the ionosphere and suffer distortion which will cause the timing between the first and second derivative crossings to vary, and consequently a consistent output will not be provided at lead 46 from a sky wave for reflected signal. In such event, the pulse responsive circuitry receiving the output of lead 46, for example the apparatus set forth in my prior patent above referred to, will continue searching and will preferentially lock on to a more consistent ground wave signal pair. The output ultimately produced can then accurately represent ground wave reception. In the event that no ground wave reception is available, due to the remote distance of the loran receiving system from a loran transmitting apparatus, switch 402 may be positioned for connecting a +5 volts as an enabling input to nand-gate 396, and the circuitry will operate in a manner for transmitting the first derivative crossover indicating pulse, regardless of its timing with reference to the second derivative crossover pulse.

While I have shown and described preferred embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. In a hyperbolic navigation system for deriving position information from at least a pair of received signals transmitted from separated locations,
   receiver means for detecting received signal envelopes and for developing an output indicative of the timing of predetermined received envelopes,
   means for determining the amplitude of a received signal,
   and means for adjusting the effective amplitude of the same received signal in response to said determination so that said amplitude falls within predetermined limits from which said receiver means can develop output information based upon the wave shape of said envelope,
   said means for adjusting the effective amplitude comprising attenuator means selectively responsive to the determination of said signal amplitude for adjusting the same.

2. The system according to claim 1 wherein said means for determining the amplitude of a received signal comprises means for measuring the slope of a the derivative of its envelope as said signal is received.

3. In a hyperbolic navigation system for deriving position information from at least a pair of received signals transmitted from separated locations,
   receiver means for detecting received signal envelopes and for developing an output indicative of the timing of predetermined received envelopes,
   means for determining the amplitude of a received signal comprising means responsive to the rate of change of the derivative of the received signal envelope within a predetermined time subsequent to the reception of said signal envelope and prior to the maximum amplitude of the received signal envelope,
   said means for adjusting the effective amplitude of the same received signal in response to said determination so that said amplitude falls within predetermined limits from which said receiver means can develop output information based upon the wave shape of said envelope,
   said means for adjusting the effective amplitude comprising attenuator means selectively responsive to the determination of said signal amplitude for adjusting the same.

4. The system according to claim 3 wherein the received signal envelope is a cosine function.

5. The system according to claim 3 wherein said means responsive to the rate of change comprises first switching means operable when said derivative reaches a first amplitude level, second switching means operable when said derivative reaches a second amplitude level, and means for determining the timing between operation of said switching means.

6. The system according to claim 5 wherein said switching means comprise tunnel diodes.

7. The system according to claim 5 wherein said means for determining the timing comprises a monostable circuit actuated in response to operation of the first switching means, and means responsive to the operation of the second switching means before conclusion of the operation of the monostable circuit.

8. The system according to claim 5 wherein said means for determining the timing comprises first and second monostable circuits actuated in response to operation of the respective first and second switching means, and means for detecting an on condition of the second monostable circuit at the conclusion of the timing period of the first monostable circuit.

9. The system according to claim 1 wherein said attenuator means comprise a plurality of attenuators disposed in alternative cascaded relation with the receiver means,
   said means for determining the amplitude of a received signal comprising circuit means for providing the derivative of the received signal envelope, a first pair of switching means successively operated by the derivative waveform within a predetermined time for actuating a first of said attenuators, and a second pair of switching means successively actuated within a similar period of time by said derivative waveform to couple a second of said attenuators in cascaded relation with the receiver means.

10. The system according to claim 9 further including means for detecting actuation of ones of said switching means within a shorter period of time for coupling a third attenuator means in cascaded relation with the receiver input.

11. In a hyperbolic navigation system for deriving position information from at least a pair of received signals transmitted from separated locations,
receiver means for detecting received signal envelopes and for developing an output indicative of the timing of predetermined received envelopes,
means for determining the amplitude of a received signal,
means for adjusting the effective amplitude of the same received signal in response to said determination so that said amplitude falls within predetermined limits from which said receiver means can develop output information based upon the wave shape of said envelope,
and means sensitive to the timing of received sky wave signals comprising means responsive to spaced portions of input signal envelope for enabling the output thereof when said portions fall within predetermined time limits indicative of non-distortion of the signal envelope by ionispheric reflection.

12. In a hyperbolic navigation system for deriving position information from at least a pair of received signals transmitted from separated locations,
receiver means for developing an output indicative of received signal envelopes,
means for measuring a pair of values of the derivative of a received signal envelope shortly after said envelope is received for determining the amplitude of said envelope,
and means for inserting amplitude adjusting attenuation means in the input signal path in response to such determination.

13. In a hyperbolic navigation system for deriving position information from at least a pair of received signals transmitted from separated locations,
receiver means for developing an output indicative of the timing of predetermined received signal envelopes,
means for providing the derivative of a received signal envelope,
and means for measuring the timing of successive points on the derivative waveform.

14. The apparatus according to claim 13 further including means for inserting attenuation in the received signal path in accordance with the slope of said first derivative waveform as measured at two successive points thereon.

15. The system of claim 13 including means for inhibiting a signal in response to incorrect timing of successive points along said first derivative waveform relative to said waveform.

16. In a hyperbolic navigation system for deriving position information from at least a pair of received signals transmitted from separated locations,
receiver means for developing an output indicative of the timing of a predetermined received signal envelope,
means for timing two successive points relative to said signal envelope,
gating means for gating a signal,
and means for coupling said timing means to inhibit said output indication in the absence of a proper interval therebetween as produced by signal distortion.

17. A receiver circuit for rejecting distorted waveforms comprising:
receiver means for detecting a waveform envelope having predetermined sinusoidal characteristics,
means for providing the first derivative of said envelope,
means for providing the second derivative of said envelope,
and means responsive to a predetermined spacing between selected portions of the first and second derivative waveforms for indicating a non-distorted signal envelope.

18. A receiver circuit for rejecting distorted waveforms comprising:
means for detecting a predetermined portion of the first derivative of the input signal envelope,
means for detecting a predetermined portion of the second derivative of the input signal envelope and for generating a signal in response thereto,
means for delaying the last mentioned signal by an amount corresponding to the normal separation of the said two waveform portions within predetermined limits for a non-distorted signal, and
means for detecting the coincidence between the first detection and the delayed signal to provide an output.

19. The method of detecting a non-distorted signal comprising:
taking the first and second derivatives of said signal,
and detecting the timing between predetermined points on the first and second derivative waveforms as fall within predetermined timing limits.

20. The system according to claim 11 wherein the received signal envelope comprises a cosine function,
means for detecting a predetermined portion of the first derivative of the input signal envelope,
means for detecting a predetermined portion of the second derivative of the input signal envelope and for generating a signal in response thereto,
means for delaying the last mentioned signal by an amount corresponding to the normal separation of the said two waveform portions within predetermined limits for a non-distorted signal, and
means for detecting the coincidence between the first detection and the delayed signal to provide an output.

21. In a hyperbolic navigation system for deriving position information from at least a pair of received signals transmitted from separated locations,
receiver means for detecting received signal envelopes and for developing an output indicative of the timing of predetermined received envelopes,
means for determining the amplitude of a received signal,
means for adjusting the effective amplitude of the same received signal in response to said determination so that said amplitude falls within predetermined limits from which said receiver means can develop output information based upon the wave shape of said envelope,
said means for adjusting the effective amplitude comprising attenuator means selectively responsive to the determination of said signal amplitude for adjusting the same, wherein said attenuator means comprises a plurality of attenuators disposed in alternative cascaded relation with the receiver means, said means for determining the amplitude of a received signal comprising circuit means for providing the derivative of the received signal envelope, a first pair of switching means successively operated by the derivative waveform within a predetermined time for actuating a first of said attenuators, and a second pair of switching means successively actuated within a similar period of time by said derivative waveform to couple a second of said attenuators in cascaded relation with the receiver means, and further including a preamplifier in alternative cascaded relation with the receiver input and operable in the absence of actuation of one of said attenuators.

22. In a hyperbolic navigation system for deriving position information from at least a pair of received signals transmitted from separated locations, receiver means for detecting received signal envelopes and for developing an output indicative of the timing of predetermined received envelopes, means for determining the amplitude of a received signal, means for adjusting the effective amplitude of the same received signal in response to said determination so that said amplitude falls within predetermined limits from which said receiver means can develop output information based upon the wave shape of said envelope, said means for adjusting the effective amplitude comprising attenuator means selectively responsive to the determination of said signal amplitude for adjusting the same, wherein said attenuator means comprises a plurality of attenuators disposed in alternative cascaded relation with the receiver means, said means for determining the amplitude of a received signal comprising circuit means for providing the derivative of the received signal envelope, a first pair of switching means successively operated by the derivative waveform within a predetermined time for actuating a first of said attenuators, and a second pair of switching means successively actuated within a similar period of time by said derivative waveform to couple a second of said attenuators in cascaded relation with the receiver means, and including field effect transistors associated respectively with each attenuator and responsive to actuation of respective switching means pairs for coupling a given attenuator in cascaded relation with the receiver means.

23. In a hyperbolic navigation system for deriving position information from at least a pair of received signals transmitted from separated locations, receiver means for detecting the received signal envelopes and for developing an output indicative of the timing of predetermined received envelopes, means for determining the amplitude of a received signal comprising means responsive to the rate of change of the derivative of the received signal envelope within a predetermined time subsequent to the reception of said signal envelope and prior to the maximum amplitude of the received signal envelope, means for adjusting the effective amplitude of the same received signal envelope in response to said determination so that said amplitude falls within predetermined limits from which said receiver can develop output information based upon the wave shape of said envelope, and means sensitive to the timing of received sky wave signals comprising means responsive to the first and second derivatives of the signal envelope for enabling said output information upon condition that axis crossing points of the first and second derivative waveforms occur within predetermined time limits indicating the absence of received signal distortion.

24. A hyperbolic navigation method for deriving position information from at least a pair of received signals transmitted from separate locations, said method comprising:

detecting the signal envelopes of said received signals for developing an output indicative of the timing of predetermined received envelopes, forming the derivative of a received signal envelope, measuring the timing between at least a pair of predetermined amplitude values of said derivative, and inserting selective attenuation values for attenuating the received signal in response to such measurement.

* * * * *